United States Patent
Liu et al.

(10) Patent No.: US 12,030,777 B2
(45) Date of Patent: Jul. 9, 2024

(54) METHOD FOR PREPARING MILLIMETER-SIZED SP³ AMORPHOUS CARBON BLOCK MATERIAL

(71) Applicant: Jilin University, Changchun (CN)

(72) Inventors: Bingbing Liu, Changchun (CN); Mingguang Yao, Changchun (CN); Yuchen Shang, Changchun (CN); Zhaodong Liu, Changchun (CN); Jiajun Dong, Changchun (CN)

(73) Assignee: Jilin University, Changchun (CN)

( * ) Notice: Subject to any disclaimer, the term of this patent is extended or adjusted under 35 U.S.C. 154(b) by 166 days.

(21) Appl. No.: 17/535,899

(22) Filed: Nov. 26, 2021

(65) Prior Publication Data

US 2023/0096646 A1     Mar. 30, 2023

(30) Foreign Application Priority Data

Sep. 26, 2021    (CN) .......................... 202111127499.9

(51) Int. Cl.
*C01B 32/156*     (2017.01)

(52) U.S. Cl.
CPC ........ *C01B 32/156* (2017.08); *C01P 2002/02* (2013.01); *C01P 2002/76* (2013.01);
(Continued)

(58) Field of Classification Search
None
See application file for complete search history.

(56) References Cited

U.S. PATENT DOCUMENTS

| | | | | |
|---|---|---|---|---|
| 6,395,214 B1 * | 5/2002 | Kear | ...................... | C04B 35/111 264/434 |
| 2015/0158727 A1 * | 6/2015 | Tian | ....................... | B82Y 30/00 264/109 |

FOREIGN PATENT DOCUMENTS

| | | |
|---|---|---|
| CN | 109821480 A | 5/2019 |
| CN | 112158835 A | 1/2021 |

(Continued)

OTHER PUBLICATIONS

Moshary, Fred, et al. "Gap reduction and the collapse of solid C 60 to a new phase of carbon under pressure." Physical review letters 69.3 (Jul. 20, 1992): 466. (Year: 1992).*

(Continued)

*Primary Examiner* — Benjamin A Schiffman
(74) *Attorney, Agent, or Firm* — Nixon & Vanderhye P.C.

(57) ABSTRACT

The invention relates to a millimeter-sized bulk spa amorphous carbon material and a method of preparing the same, and the method comprises a step of performing a high-temperature and high-pressure (HTHP) treatment on $C_{60}$ powder at a temperature of 450-1100° C., preferably 700-1000° C., more preferably 900-1000° C., and most preferably 1000° C., and a pressure of 20-37 GPa, preferably 20-30 GPa, and most preferably 27 GPa, so as to obtain the millimeter-sized bulk $sp^3$ amorphous carbon material. The $sp^3$ carbon content in the amorphous carbon material is adjustable by changing the temperature and pressure conditions, so that the $sp^3$ content is greater than 80%, and the $sp^3$ content of high-quality samples is close to 100%. The optical band gap and thermal conductivity of the series of amorphous carbon materials can be effectively adjusted. The obtained series of amorphous carbon materials have ultra-high hardnesses, high thermal conductivities, adjustable band gaps (1.90-2.79 eV) which exceed the ranges of the band gaps of amorphous silicon and germanium. As a result, a new space is opened up for the application of amorphous materials.

13 Claims, 10 Drawing Sheets

(52) U.S. Cl.
CPC ...... *C01P 2004/60* (2013.01); *C01P 2006/32* (2013.01); *C01P 2006/40* (2013.01); *C01P 2006/60* (2013.01); *C01P 2006/80* (2013.01); *C01P 2006/90* (2013.01)

(56) References Cited

FOREIGN PATENT DOCUMENTS

| DE | 102004026976 | A1 | * | 3/2006 | ................ B01J 3/06 |
|----|--------------|----|---|--------|---------------------------|
| JP | 08217429 | A | * | 8/1996 | |

OTHER PUBLICATIONS

Hirai, Hisako, et al. "Amorphous diamond from C60 fullerene." Applied physics letters 64.14 (Apr. 4, 1994): 1797-1799. (Year: 1994).*

Blank, V. D., et al. "Ultrahard and superhard carbon phases produced from C60 by heating at high pressure: structural and Raman studies." Physics Letters A 205.2-3 (Sep. 1995): 208-216. (Year: 1995).*

Blank, V. D., et al. "Structures and physical properties of superhard and ultrahard 3D polymerized fullerites created from solid C60 by high pressure high temperature treatment." Carbon 36.5-6 (Aug. 27, 1998): 665-670. (Year: 1998).*

Shang, Yuchen, et al. "Ultrahard bulk amorphous carbon from collapsed fullerene." Nature 599.7886 (Nov. 24, 2021): 599-604. (Year: 2021).*

Tang, Hu, et al. "Synthesis of paracrystalline diamond." Nature 599.7886 (Nov. 24, 2021): 605-610. (Year: 2021).*

Sheng, Howard, et al. "Synthesis of Paracrystalline Diamond." (May 7, 2021). (Year: 2021).*

First Office Action dated Jul. 25, 2022 in Chinese Application No. 202111127499.9, with English translation, 15 pages.

Zhou Lin, Principle and Applications of Explosive Energy Transformation, National Defense Industry Press, Jan. 31, 2015, total pages 3, relevant p. 243.

Wang Zhenting, "Graphite Advanced Processing Technology," Harbin Institute of Technology Press, Jun. 30, 2017, 7 total pages, relevant pp. 86-89.

Zhang Linzhou, Chinese Academic Journals (CD-ROM Edition), Molecular Dynamics and First Principle Studies of Diamond-Like Carbon Films, Nov. 15, 2012, 7 total pages, relevant pp. A005-A015.

J. Robertson, "Diamond-Like Amorphous Carbon," Materials Science and Engineering, R 37, 2002, pp. 129-281.

P. J. Fallon et al., Properties of Filtered-Ion-Beam-Deposited Diamond-like Carbon as a Function of Ion Energy, Physical Review B, The American Physical Society, vol. 48, No. 7, Aug. 15, 1993, pp. 4777-4782.

J. Robertson, "Comparison of Diamond-Like Carbon to Diamond for Applications," Phys. Stat. Sol. (a) 205, No. 9, Published Aug. 22, 2008, pp. 2233-2244.

Natalia Dubrovinskaia et al., "Nanocrystalline Diamond Synthesized from $C_{60}$," Diamond & Related Materials 14, 2005, Available Online: Jul. 25, 2004, pp. 16-22.

H. Sumiya et al., "Conditions and Mechanism of Formation of Nano-Polycrystalline Diamonds on Direct Transformation from Graphite and Non-Graphitic Carbon at High Pressure and Temperature," High Pressure Research, vol. 26, No. 2, Jun. 2006, pp. 63-69.

H. Sumiya et al., "Microstructure and Mechanical Behaviors of Nano-Polycrystalline Diamonds Synthesized by Direct Conversion Sintering under HPHT," Mater. Res. Soc. Symp. Proc., vol. 987, Materials Research Society, 2007, 6 pages.

Alexander A. Balandin, "Thermal Properties of Graphene and Nanostructured Carbon Materials," Nature Materials, vol. 10, Published Online: Jul. 22, 2011, pp. 569-581.

* cited by examiner

METHOD FOR PREPARING MILLIMETER-SIZED SP³ AMORPHOUS CARBON BLOCK MATERIAL

This application claims priority to Chinese Patent Application No. 202111127499.9 filed Sep. 26, 2021, the entire contents of which are hereby incorporated by reference.

TECHNICAL FIELD

The invention belongs to the technical field of high-temperature and high-pressure (HTHP) preparation of novel carbon materials. Specifically, it relates to a millimeter-sized bulk amorphous carbon material with a high $sp^3$ content, and a method for synthesizing the bulk $sp^3$ amorphous carbon material by using a large-volume press.

BACKGROUND

Glass, rubber, plastic and other substances commonly seen in daily life are all amorphous materials, and their internal atoms have no long-range periodic arrangement. Due to the random arrangement of atoms, amorphous materials can exhibit unique properties that are different from corresponding crystals, such as isotropy and non-definite melting point. The structural characterization of and the relationship between the structure and the physical properties of amorphous materials have always been a subject of interest but challenging. It has always been the goal of scientific researchers to explore and synthesize new types of amorphous materials with excellent properties.

Carbon is one of the most abundant elements in nature. It has a unique bonding ability. The orbitals occupied by the electrons in the outer layer of carbon atoms can be hybridized in various forms such as to form sp, $sp^2$, and $sp^3$ hybrid bonds, as a result, a variety of allotropes with very different structures and properties, including $sp^2$ graphite, graphene, carbon nanotubes, $sp^3$ diamond, V carbon, etc., are formed. In contrast, currently for amorphous carbon, there are only amorphous carbons having a $sp^2$ hybridized form such as glassy carbon, and amorphous carbons having a mixture of $sp^2$ and $sp^3$ bonds, such as diamond-like carbon film, tetrahedral amorphous carbon, etc. In addition, amorphous carbons having a mixture of $sp^2$ and $sp^3$ hybridizations are mostly synthesized in the form of thin films, and most of them contain hydrogen (the highest content of $sp^3$ is 85-88%). It has always been a dream of mankind to prepare bulk amorphous carbon with 100% $sp^3$ hybrid bonds like diamond, and its structure and properties are also promising.

Crystals and non-crystals can be transformed into each other under certain conditions. For example, corresponding crystalline quartz crystal can be melted and quickly cooled to obtain quartz glass. Crystal can be obtained by heat treatment of amorphous semiconductor material at a certain temperature. However, the preparation of $sp^3$ amorphous carbon cannot be achieved through this method, because diamond, which has a fully $sp^3$-bonded structure, has a very high melting point, and graphitization transformation usually occurs at a high temperature, and thus $sp^3$ amorphous carbon cannot be obtained.

Considering the transformation of the topological structure, carbon structures containing odd carbon rings (such as 5 or 7-membered carbon rings) are ideal precursors for exploring amorphous carbon. The treatment of $C_{60}$ under HTHP conditions is a good example. Bulk black $sp^3$-rich amorphous carbon was prepared under an HTHP condition of 13 GPa and 900-1830 K from fullerene $C_{60}$ (a football-like carbon molecule having $sp^2$ hybridization) by Russian scientist Professor Blank, et al., which had extremely high hardness (ultrahard) and can scratch the surface of diamond. And this amorphous carbon also had semiconductive to semi-metallic conductive properties, but the structural model of this amorphous carbon was controversial. At the same time, Hirai, et al. synthesized transparent amorphous carbon (which was called amorphous diamond) by shocking compressing fullerene $C_{60}$ to 55 GPa and 2000 K. Recently, transparent amorphous carbon was synthesized in a diamond anvil cell by HPHT treating glassy carbon at 50 GPa and 1800 K. However, the sizes of the samples synthesized by these two methods were too small, in micrometers (several to tens of micrometers), which greatly limits the characterization of the structure and properties of these materials.

SUMMARY

In view of the scientific problems related to the small size of amorphous carbon samples, low $sp^3$ content, insufficient structure and performance characterization, and limited synthesis technology of bulk $sp^3$ amorphous carbon as mentioned above, the invention provides a millimeter-sized bulk amorphous carbon material with high $sp^3$ content and a method for preparing this large-size (millimeter-sized) high-quality transparent bulk $sp^3$ amorphous carbon material at a high temperature and a high pressure using advanced large-volume press technology, and by changing the synthesis conditions, a method for tuning the $sp^3$ content, mechanical, optical and thermal properties of the bulk amorphous carbon is also provided.

The specific technical schemes of the invention are as follows:

A method for preparing a millimeter-sized bulk $sp^3$ amorphous carbon material, the method comprises the steps of: performing an HTHP treatment on a sample of $C_{60}$ powder at a temperature of 450-1100° C., preferably 700-1000° C., more preferably 900-1000° C., and most preferably 1000° C., and a pressure of 20-37 GPa, preferably 20-30 GPa, and most preferably 27 GPa, so as to obtain the millimeter-sized bulk $sp^3$ amorphous carbon material.

In an embodiment, the pressure is higher than or equal to 20 GPa and less than 37 GPa.

In an embodiment, the HTHP treatment is carried out in a large-volume press. Preferably, the $C_{60}$ powder is encapsulated into a sample chamber made of metal Re to undergo the HTHP treatment.

In an embodiment, the method further comprises a step of heat treating the $C_{60}$ powder to obtain dried $C_{60}$ powder before the HTHP treatment. Preferably, the temperature of the heat-treatment is in the range of 80-150° C. and the heat-treatment lasts for 2-4 hours.

In an embodiment, the method further comprises pressurizing the $C_{60}$ powder to said pressure within 7-10 hours, and heating the $C_{60}$ powder to said temperature using a rhenium tube.

In an embodiment, the method further comprises a step of heat and pressure preservation of the sample after being subjected to the HTHP treatment. Preferably, the heat and pressure preservation lasts for 1-2 hours.

In an embodiment, the method further comprises a step of cooling and depressurizing the treated sample after the HTHP treatment. Preferably, the treated sample is cooled to room temperature by being quenched immediately and is depressurized to ambient pressure within 14-20 hours.

In an embodiment, the method further comprises ultrasonically cleaning the treated sample in acetone and polishing the treated sample with a diamond grinding disc to obtain a pure bulk amorphous carbon material.

In an embodiment, the mass purity of the $C_{60}$ powder used in the method is greater than or equal to 99.9%.

In an embodiment, the sp$^3$ content of the bulk sp$^3$ amorphous carbon material obtained by the method of the invention may be greater than 80%, preferably in the range of 83.3% to 95.1%.

In an embodiment, the optical band gap of the bulk sp$^3$ amorphous carbon material obtained by the method of the invention may be in the range of 1.90-2.79 eV.

In an embodiment, the thermal conductivity of the bulk sp$^3$ amorphous carbon material obtained by the method of the invention may range from 18-26 W/mK.

In an embodiment, the Vickers hardness of the bulk sp$^3$ amorphous carbon material obtained by the method of the invention may be in the range of 95-102 GPa.

In an embodiment, the method comprises the following steps:

step 1: heating $C_{60}$ powder at a temperature in the range of 80-150° C. for 2-4 hours to obtain dried $C_{60}$ powder;

step 2: encapsulating the $C_{60}$ powder heated in step 1 into a sample chamber made of metal Re, which is then placed in an HTHP apparatus of a large-volume press to undergo HTHP treatment at a temperature in the range of 700-1000° C. and a pressure in the range of 20-37 GPa, followed by heat and pressure preservation for 1-2 hours, subsequent immediate quenching to room temperature and slowly depressurizing to ambient pressure, and taking out the sample; and step 3: ultrasonically cleaning the sample in acetone, and then polishing the cleaned sample with a diamond grinding disc to obtain a pure bulk sp$^3$ amorphous carbon material.

In an embodiment, there is provided a translucent or transparent millimeter-sized bulk sp$^3$ amorphous carbon material that can be prepared according to the method of the invention. The bulk sp$^3$ amorphous carbon material may have an sp$^3$ content of higher than 80%, preferably in the range of 83.3-95.1%; an optical band gap in the range of 1.90-2.79 eV; a thermal conductivity in the range of 18-26 W/mK; and a Vickers hardness in the range of 95-102 GPa.

In an embodiment, the bulk sp$^3$ amorphous carbon material prepared according to the method of the invention may have a size of about 1-2 mm. For example, the obtained bulk sp$^3$ amorphous carbon material may be a cylinder with a diameter in the range of 1-1.5 mm and a height in the range of 0.5-2 mm.

In the invention, a series of millimeter-sized bulk transparent sp$^3$ amorphous carbon with excellent properties are synthesized by subjecting $C_{60}$ precursors to HTHP treatment at a pressure range of 20 GPa to 37 GPa and well-controlled temperatures in a large-volume press. Without being bound by any theory, the inventor believes that the synthesis of high-quality bulk sp$^3$ amorphous carbon benefits from a higher synthesis pressure, and at a pressure of about 27 GPa, carbon cage collapses and transforms into bulk amorphous sp$^3$ carbon, which is a amorphous to amorphous transition. In the invention, advanced large-volume press technology is used to realize the synthesis of millimeter-sized transparent bulk sp$^3$ amorphous carbon materials, and the sp$^3$ carbon content in the amorphous carbon material is tunable by changing the temperature and pressure conditions, so that the optical band gap and thermal conductivity of the bulk amorphous carbon material can be effectively adjusted. The obtained series of amorphous carbon materials have ultra-high hardness, high thermal conductivity, and tunable band gaps (1.90-2.79 eV) which exceed the ranges of the band gaps of amorphous silicon and germanium, and open a new space for the application of amorphous materials.

DETAILED DESCRIPTION

The invention will be further explained below with reference to the examples.

Figure 18:
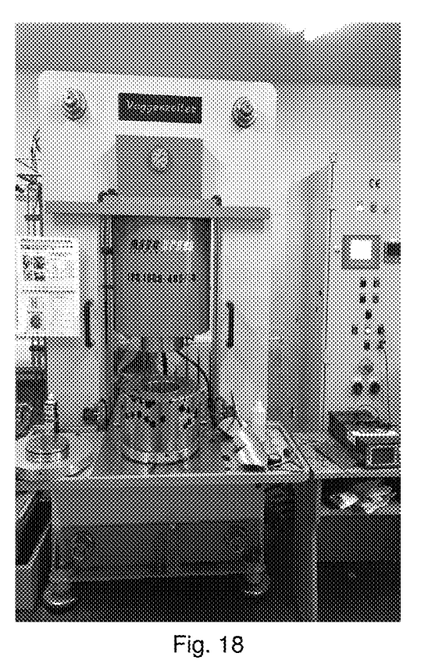
FIG. 18 is a real photograph of Walker-type Max Voggenzeitez, LPR1000-400/50 high-pressure apparatus with a 6-8-type double-stage compression system.
Figure 19:
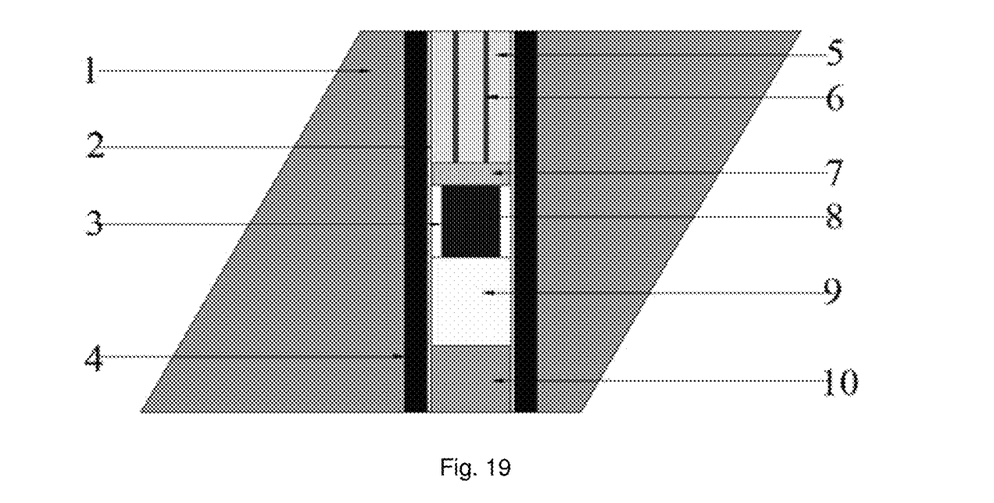
FIG. 19 is a schematic view of 10/4 high-pressure assembly.
Figure 20:
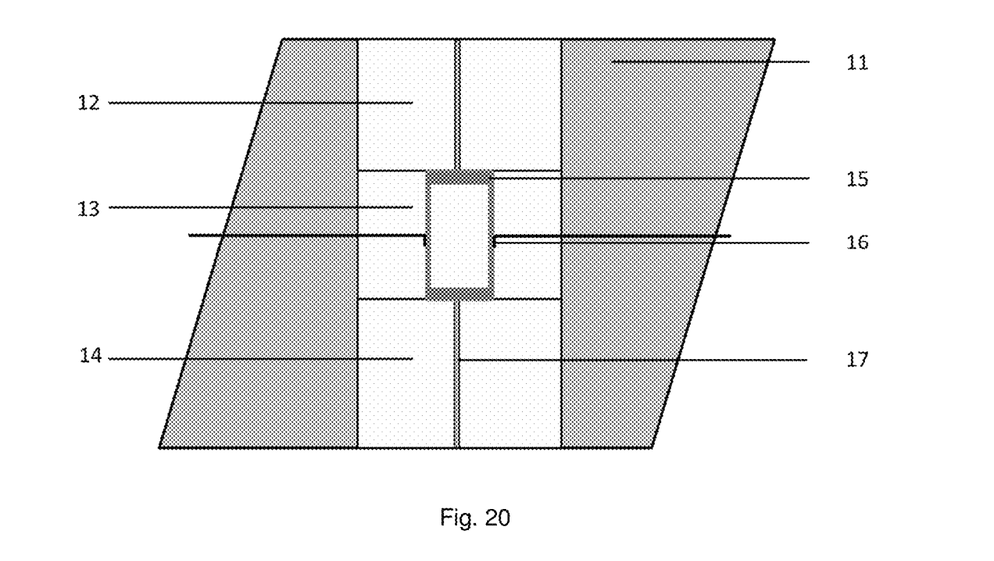
FIG. 20 is a schematic view of 7/3 and 6/1.5 high-pressure assemblies.

In Examples 1 to 5, a Walker-type large-volume press high-pressure apparatus, the appearance and structure of which is shown in FIG. 18, was used. In this apparatus, double-stage compression was performed by using eight truncated cubic tungsten carbide anvils, with the eight cubic anvils assembled into a larger cube, forming a regular octahedral high-pressure cavity in the center. The sample was placed inside a magnesium oxide octahedral pressure transmission medium, and the diameter and height of the sample chamber were each greater than 1.5 mm. ZK01F tungsten carbide anvil produced by Heyuan Zhengxin Cemented Carbide Co., Ltd may be used as the second-stage anvil. In Example 1, a commercial 10/4 high-pressure assembly (the edge length of the octahedral pressure transmission medium=10 mm/the truncated edge length of second-stage tungsten carbide anvil=4 mm) as shown in FIG. 19 was used. In this figure, 1 is a magnesium oxide octahedron; 2 is a rhenium tube; 3 is a boron nitride tube; 4 is lanthanum chromate; 5 is four-hole alumina; 6 is a thermocouple; 7 is an alumina sheet; 8 is the sample; 9 is a magnesium oxide cylinder; 10 is a zirconia cylinder; In Examples 2, 3, and 4, a self-designed 7/3 high-pressure assembly (the edge length of the octahedral pressure transmission medium=7 mm/the cut-off corner size of the tungsten carbide=3 mm) as shown in FIG. 20 was adopted. In Example 5, a 6/1.5 high pressure assembly (the edge length of the octahedral pressure transmission medium=6 mm/the truncated edge length of second-stage tungsten carbide anvil=1.5 mm) which is the same with the 7/3 assembly except for a reduced overall size, was adopted. In FIG. 20, 11 is a magnesium oxide octahedron; 12, 13, and 14 are zirconia tubes; 15 is a rhenium sample chamber; 16 is a thermocouple; 17 is a molybdenum cylinder electrode. The specific method for encapsulating the sample into the 7/3 assembly was as follows: the sample powder was pressed into a cylinder with a jack, and then placed into the rolled rhenium tube sample chamber with both ends sealed; the zirconia tube 14, the molybdenum cylinder electrode 17, and the zirconia tube 13 were put into the magnesium oxide octahedron 11, the thermocouples 16 were inserted at the waist of the octahedron from both ends, and then the sample chamber was put into the zirconia tube 13 such that the thermocouples were close to the rhenium sample chamber; finally, the remaining zirconia tube 12 and the molybdenum cylinder electrode were put into the octahedron.

Example 1

10 mg of dried high-purity $C_{60}$ powder was put into a 10/4 high-pressure assembly, which was then put into a high-pressure apparatus, pressurized to a pressure of 20 GPa in 8 hours, and heated to a temperature of 1000° C. with a rhenium tube before heat preservation for 1 hour, and then immediately quenched to room temperature, and depressurized to ambient pressure in 16 hours. The high-pressure assembly was then taken out and opened to obtain the sample with a size of about 1.5 mm. The sample was ultrasonically cleaned with acetone, polished with a diamond grinding disc, and then ultrasonically cleaned with alcohol for hardness and thermal conductivity tests.

Figure 1:
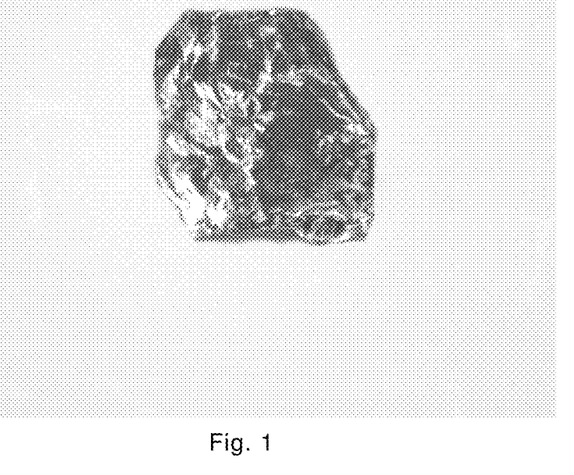
FIG. 1 is an optical photograph of the bulk amorphous carbon sample synthesized at 20 GPa and 1000° C. in Example 1.
Figure 2:
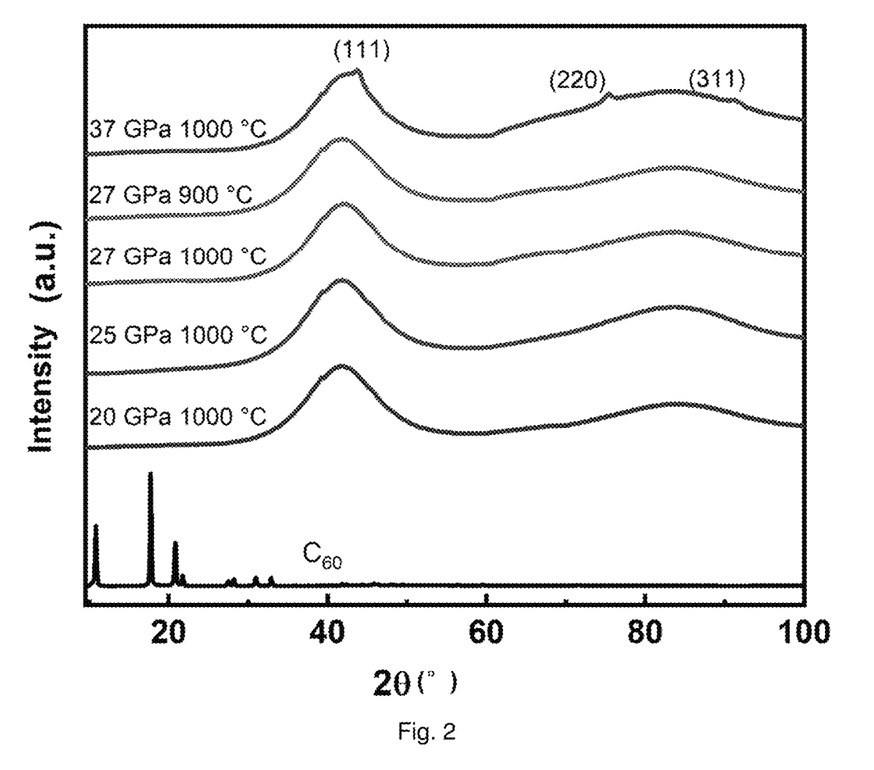
FIG. 2 shows the XRD spectra of the initial fullerene $C_{60}$ powder and the bulk amorphous carbon samples synthesized under different HPHT conditions.
Figure 3:
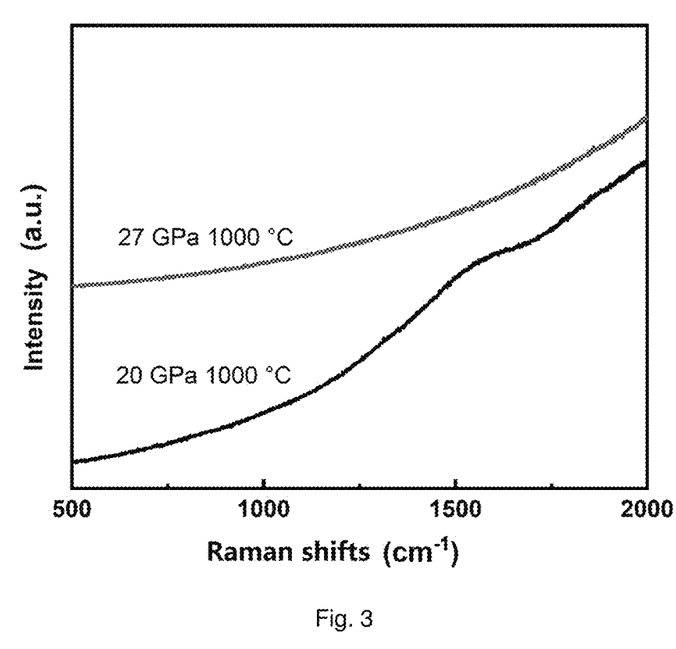
FIG. 3 is the Raman spectra of the bulk amorphous carbon samples synthesized in Example 1 and Example 3.
Figure 4:
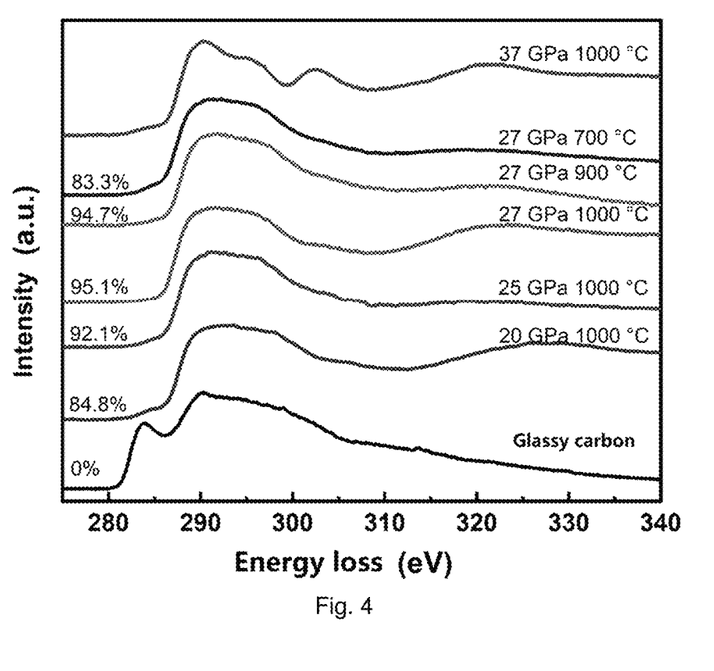
FIG. 4 shows the electron energy loss spectra (EELS) of standard fully sp$^2$ glassy carbon sample and the bulk amorphous carbon sample synthesized under different temperature and pressure conditions.
Figure 5:
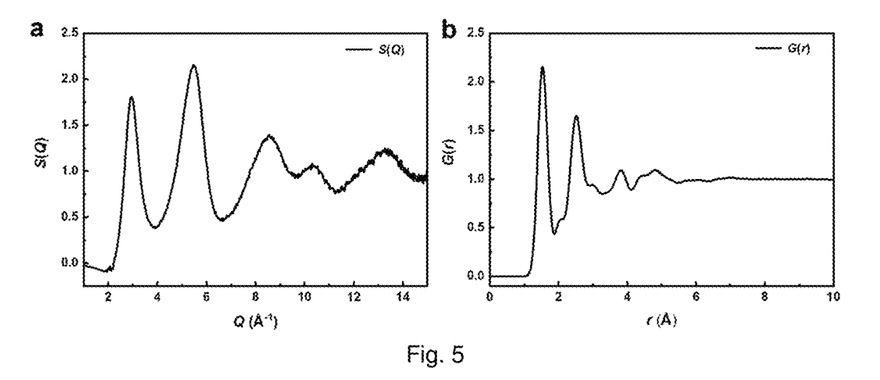
FIG. 5 is the structure factor and PDF data diagram of the bulk amorphous carbon sample synthesized in Example 1.
Figure 6:
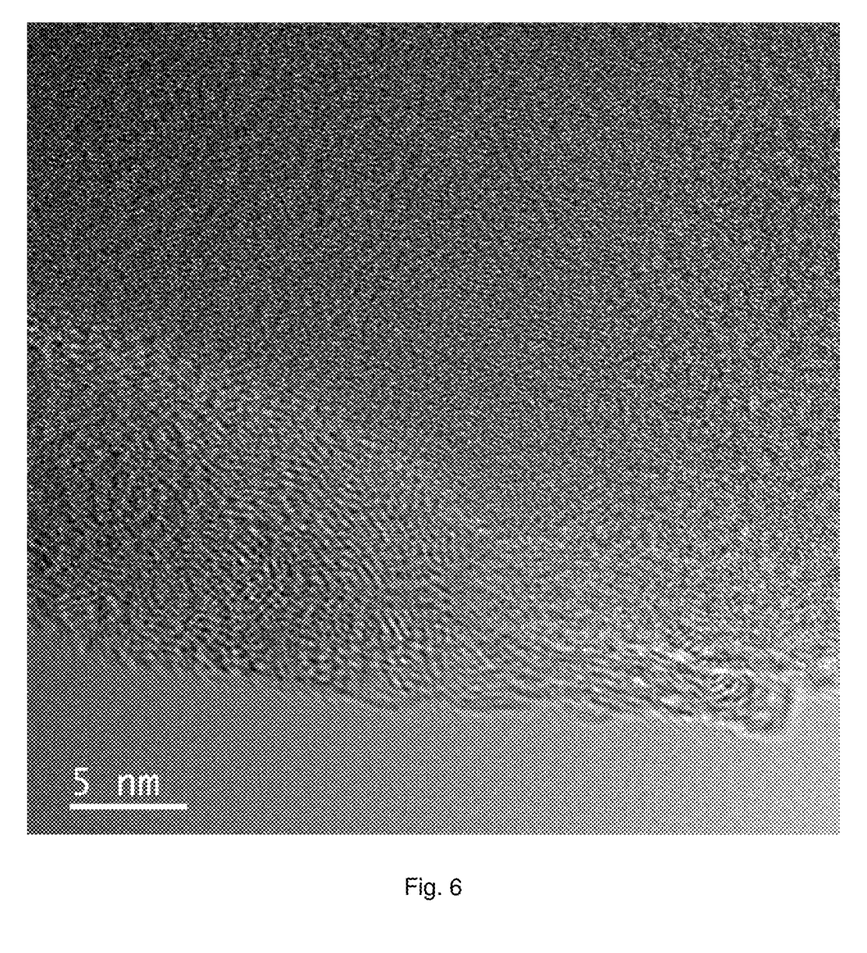
FIG. 6 is an HRTEM image of the bulk amorphous carbon sample synthesized in Example 1.
Figure 7:
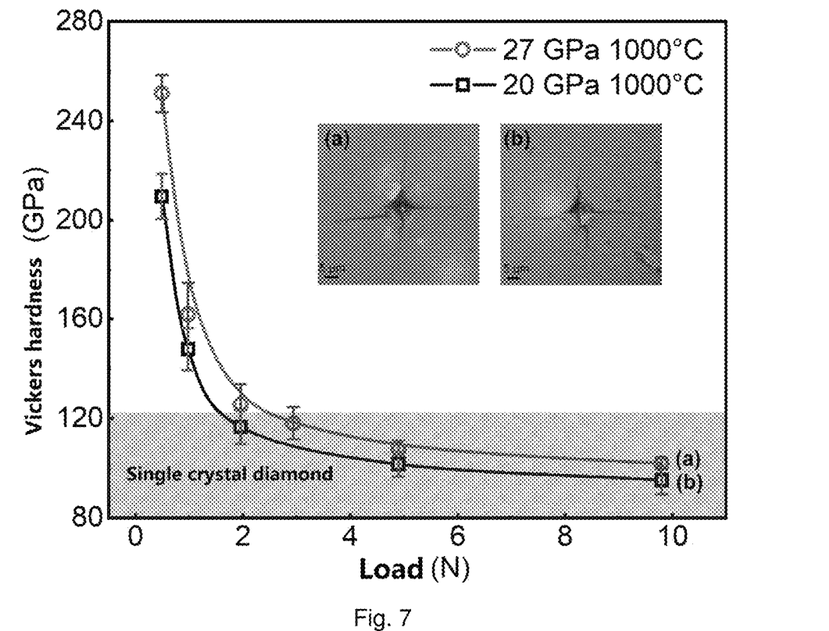
FIG. 7 is the curve of the Vickers hardness value of the bulk amorphous carbon samples synthesized in Example 1 and Example 3 as a function of load. The inset is an optical photo of the indentation at a load of 9.8 N.
Figure 8:
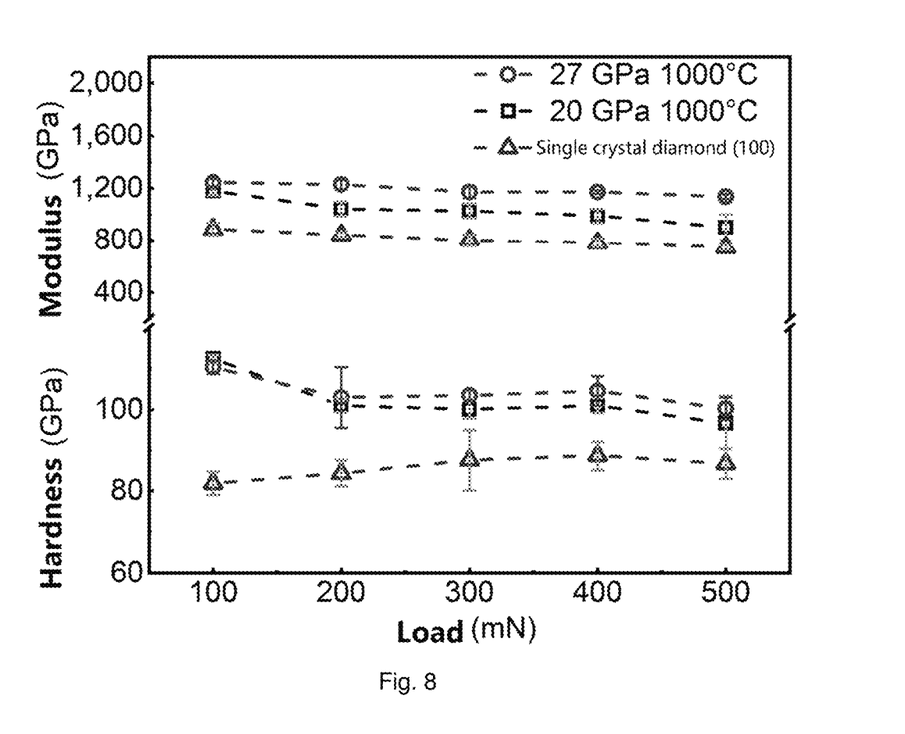
FIG. 8 shows the curves of Young's modulus and nanoindentation hardness of the bulk amorphous carbon samples synthesized in Example 1 and Example 3 and (100) face of single crystal diamond as a function of load.
Figure 9:
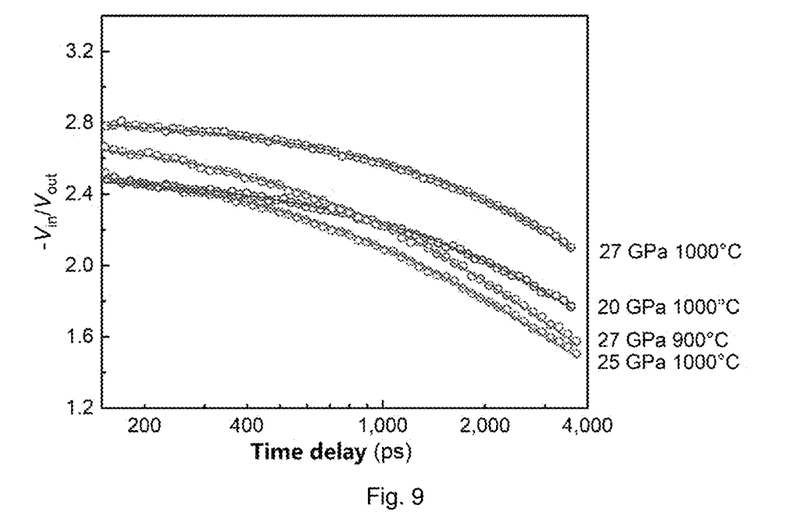
FIG. 9 shows the TDTR test data and fitting curves of four amorphous carbon samples synthesized in Examples 1, 2, 3, and 4.
Figure 10:
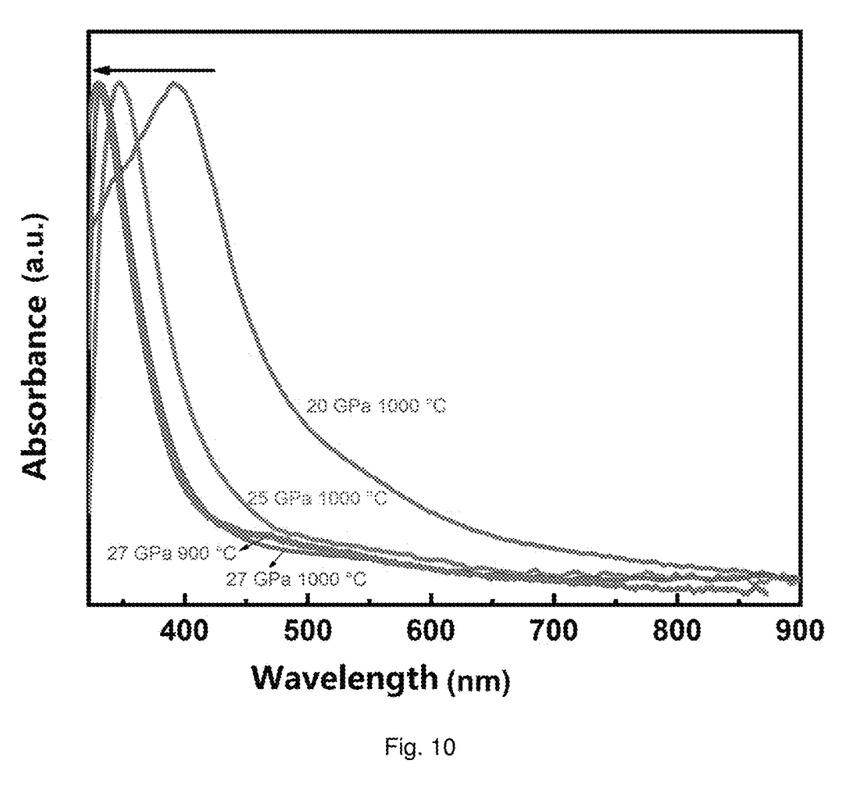
FIG. 10 shows the ultraviolet-visible absorption spectra of four amorphous carbon samples synthesized in Examples 1, 2, 3, and 4.

The optical photograph of the amorphous carbon sample is shown in FIG. 1. The sample was translucent with a yellow-brown colour. The structure and properties of cleaned sample was characterized. The XRD spectrum of the sample (as shown in FIG. 2) shows two broad peaks at 42° and 84°, indicating that the sample had an amorphous structure. In the recorded Raman spectrum of the sample, only a weak G band was observed near 1560 cm$^{-1}$, indicating the presence of a small amount of sp$^2$ carbon component in the sample (as shown in FIG. 3). Further, the spa content of the sample was estimated as 84.8±3.0% through electron energy loss spectrum (as shown in FIG. 4). In order to further analyze the fine structure of the amorphous carbon sample, high-energy synchrotron radiation XRD measurement was carried out, and the structure factor S(Q) and PDF data of the sample were obtained (FIG. 5). The data shows that the first $r_1$ (1.53 Å) and second $r_2$ (2.51 Å) nearest-neighbor distances of the sample were slightly smaller than that of diamond, and the bond angle was calculated as 110.2°. A bond angle slightly larger than that of diamond indicates a small amount of sp$^2$ content in the sample. The transmission electron micrograph of the sample (FIG. 6) shows that there was no long-range ordered structure in the sample, and a very small amount of disordered sp$^2$ carbon was also observed, which was consistent with the results of the above data. The mechanical properties of sample were tested, and it had a Vickers hardness of 95±5 GPa (FIG. 7), and a Young's modulus of 900-1180 GPa (FIG. 8). The thermal conductivity of sample was tested by time-domain thermal reflectance method (TDTR), and the thermal conductivity of the sample reached 18 W/mK (FIG. 9). In addition, the optical band gap of the sample was calculated as 1.90 eV by UV-visible absorption test (FIG. 10).

Example 2

5 mg of dried high-purity $C_{60}$ powder was put into a 7/3 high-pressure assembly, which was then put into a high-pressure apparatus, pressurized to a pressure of 25 GPa in 7 hours, and heated to a temperature of 1000° C. with a rhenium tube before heat preservation for 1 hour, and then immediately quenched to room temperature, and depressurized to ambient pressure in 14 hours. The high-pressure assembly was then taken out and opened to obtain the sample with a size of about 1 mm. The sample was ultrasonically cleaned with acetone, polished with a diamond grinding disc, and then ultrasonically cleaned with alcohol for thermal conductivity test.

Figure 11:
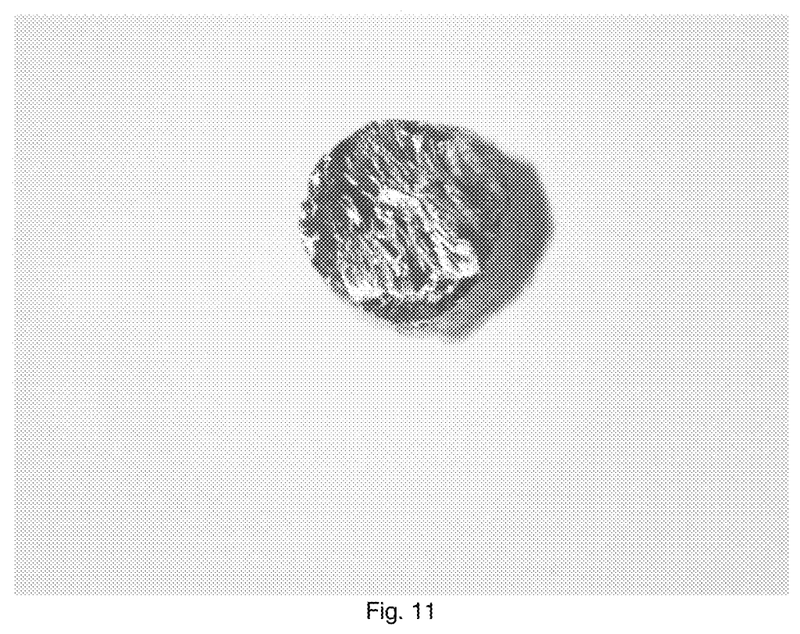
FIG. 11 is an optical photograph of the bulk amorphous carbon sample synthesized at 25 GPa and 1000° C. in Example 2.

The optical photograph of the amorphous carbon sample is shown in FIG. 11. The sample was translucent with a yellow-brown colour. The structure and properties of cleaned sample was characterized. Similar to that of the sample synthesized in Example 1 (20 Gpa and 1000° C.), the XRD spectrum of the sample (as shown in FIG. 2) shows two broad peaks at 42° and 84°, indicating that the sample had an amorphous structure. By analysis of electron energy loss spectrum (FIG. 4), it was estimated that the sp$^3$ content of the sample was 92.1±0.8%, which was slightly higher than that of the sample synthesized in Example 1, indicating that the increase in pressure may effectively contribute to the conversion of $C_{60}$ to an amorphous carbon with a higher sp$^3$ content. The thermal conductivity of sample was tested by TDTR, and found its thermal conductivity is 19 W/mK (FIG. 9). The optical band gap of the sample was calculated as 2.51 eV through the UV-visible absorption test (FIG. 10). Compared to example 1, it was found that the sp$^3$ carbon content in the amorphous carbon samples can be tuned as the pressure increases, and the optical and thermal properties of the amorphous carbon samples can further be effectively adjusted.

Example 3

5 mg of dried high-purity $C_{60}$ powder was put into a 7/3 high-pressure assembly, which was then put into a high-pressure apparatus, pressurized to a pressure of 27 GPa in 10 hours, and heated to a temperature of 1000° C. with a rhenium tube before heat preservation for 1 hour, and then immediately quenched to room temperature, and depressurized to ambient pressure in 20 hours. The high-pressure assembly was then taken out and opened to obtain the sample with a size of about 1 mm. The sample was ultrasonically cleaned with acetone, polished with a diamond grinding disc, and then ultrasonically cleaned with alcohol for hardness and thermal conductivity tests.

Figure 12:
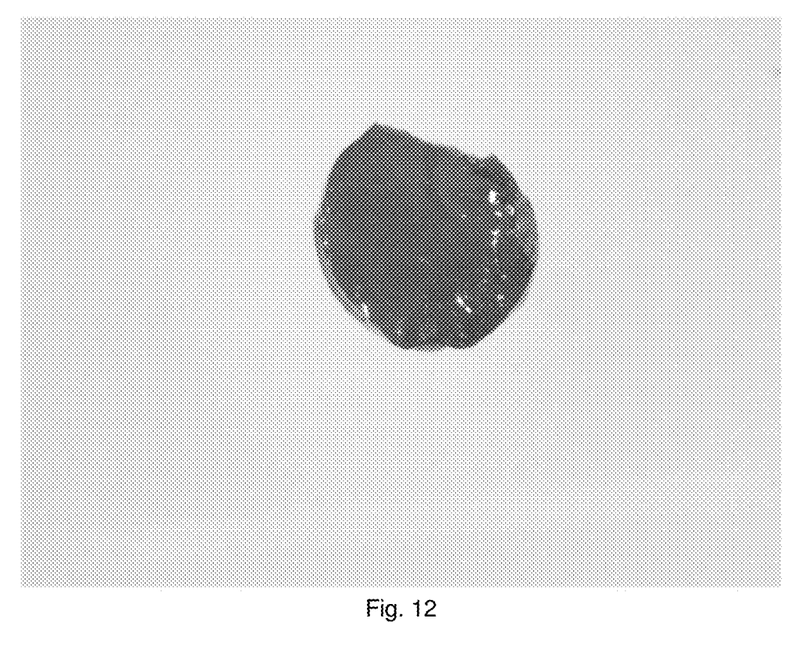
FIG. 12 is an optical photograph of the bulk amorphous carbon sample synthesized at 27 GPa and 1000° C. in Example 3.
Figure 13:
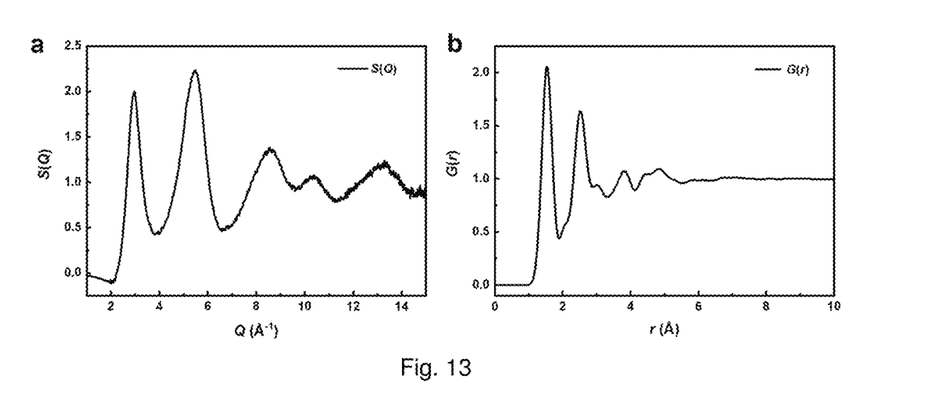
FIG. 13 is the structure factor and PDF data diagram of the bulk amorphous carbon sample synthesized in Example 3.
Figure 14:
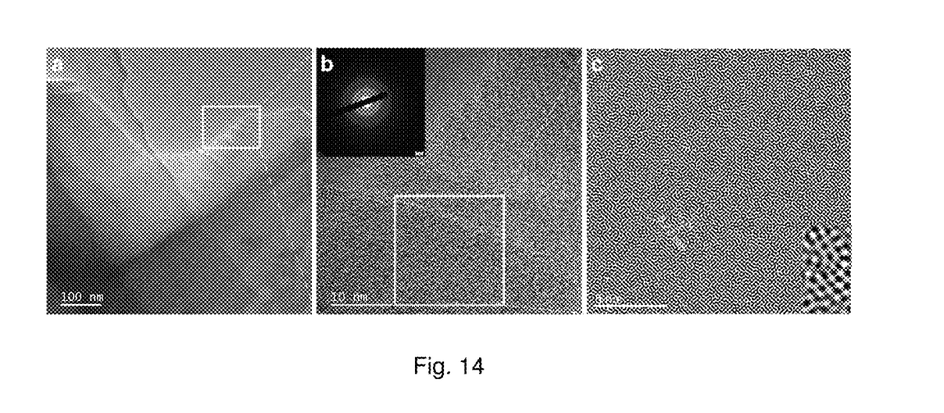
FIG. 14 is the HRTEM image and selected area electron diffraction (SAED) of the bulk amorphous carbon sample synthesized in Example 3.

The optical photograph of the amorphous carbon sample is shown in FIG. 12. The sample was transparent with a yellow colour, which had a significantly improved quality than that of each of the samples in Examples 1-2. The structure and properties of cleaned sample was characterized. Similarly, the XRD spectrum of the sample (as shown in FIG. 2) shows two broad peaks at 42° and 84°, indicating that the sample had an amorphous structure. In the recorded Raman spectrum of the sample (as shown in FIG. 3), no Raman signal except for a strong photoluminescence background was observed, and the weaker G band in the Raman spectrum of the sample in Example 1 also disappeared completely here, which indicates that the amorphous carbon sample synthesized at 27 GPa and 1000° C. was close to 100% $sp^3$ amorphous carbon. The electron energy loss spectrum of the sample shows that 1s-$\pi^*$ peak at 284 eV almost completely disappeared (FIG. 4). The $sp^3$ content of the sample was estimated to be 95.1±1.7% by using the Peak-ratio method. Similarly, in order to further analyze the fine structure of the amorphous carbon sample, the high-energy synchrotron radiation XRD measurement was performed to obtain the structure factor S(Q) and PDF data of the sample (FIG. 13). The data shows that the first $r_1$ (1.54 Å) and second $r_2$ (2.52 Å) nearest-neighbor distances in the sample were almost identical with that of diamond, with bond angle calculated as 109.8°, which further indicates its $sp^3$ four-coordinate structure. The density of the sample was calculated as 3.2±0.1 g/cm$^3$ from EELS low energy loss spectra, and by Archimedes test method, the density was determined as higher than 3.3 g/cm$^3$. The coordination number of the sample was further calculated to be about 4.05 based on the density value and the PDF data. The microstructure of the sample was analyzed by transmission electron microscope (FIG. 14), and glass-like fracture morphology was observed at low magnification, indicating its amorphous characteristics (FIG. 14, FIG. a). Similarly, no long-range ordered crystal structure was observed using the high-resolution transmission electron microscopy (HR-TEM). And only two quite diffuse halos were observed in the SAED of the sample (FIG. 14, FIG. b), which corresponds to the two broad peaks in XRD. An inverse Fourier transform of the HRTEM image (FIG. 14, FIG. c) showed that the amorphous carbon contained a large number of medium-range ordered clusters (<1 nm) with a diamond-like structure. These diamond-like clusters are randomly distributed in the amorphous network, which together constitute the amorphous carbon structure. Distorted "crystal-plane-like" stripes were observed in these diamond-like clusters with a d-spacing of about 0.22 nm, which is consistent with the results of XRD and electron diffraction. The amorphous carbon sample had superior mechanical and thermal properties due to a nearly 100% $sp^3$ content and a unique amorphous network structure. The mechanical properties of sample were tested, and it had a Vickers hardness of up to 102±2 GPa (FIG. 7), and a Young's modulus of 1135-1243 GPa (FIG. 8). The thermal conductivity of sample was tested by TDTR, and the thermal conductivity of the sample reached 26 W/mK (FIG. 9). In addition, the optical band gap of the sample was calculated as 2.66 eV by UV-visible absorption test (FIG. 10).

Example 4

5 mg of dried high-purity $C_{60}$ powder was each put into a 7/3 high-pressure assembly, which was then put into a high-pressure apparatus, pressurized to a pressure of 27 GPa in 10 hours, and heated to a temperature of 900° C. and 700° C., respectively, with a rhenium tube, before heat preservation for 1 hour, and then immediately quenched to room temperature, and depressurized to ambient pressure in 20 hours. The high-pressure assembly was then taken out and opened to obtain each of the samples with a size of about 1 mm. The two samples synthesized were ultrasonically cleaned with acetone, polished with a diamond grinding disc, and then ultrasonically cleaned with alcohol for thermal conductivity test.

Figure 15:
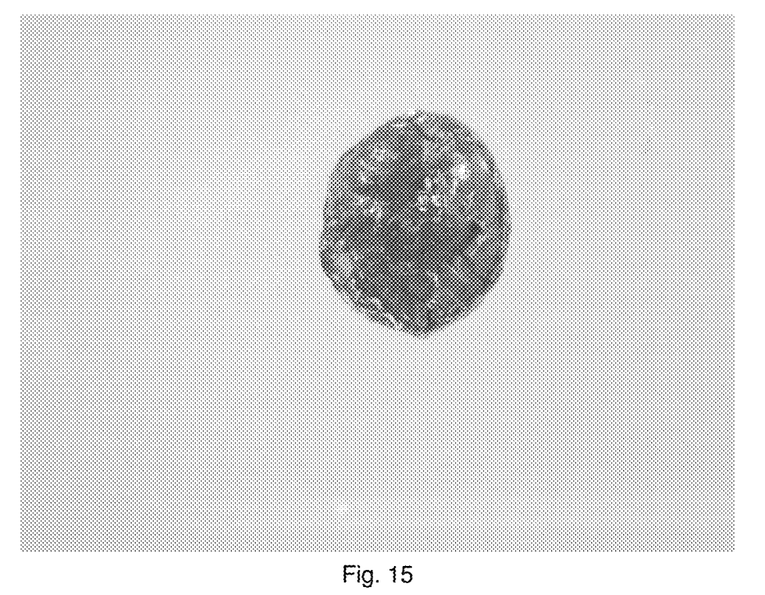
FIG. 15 is an optical photograph of the bulk amorphous carbon sample synthesized at 27 GPa and 900° C. in Example 4.
Figure 16:
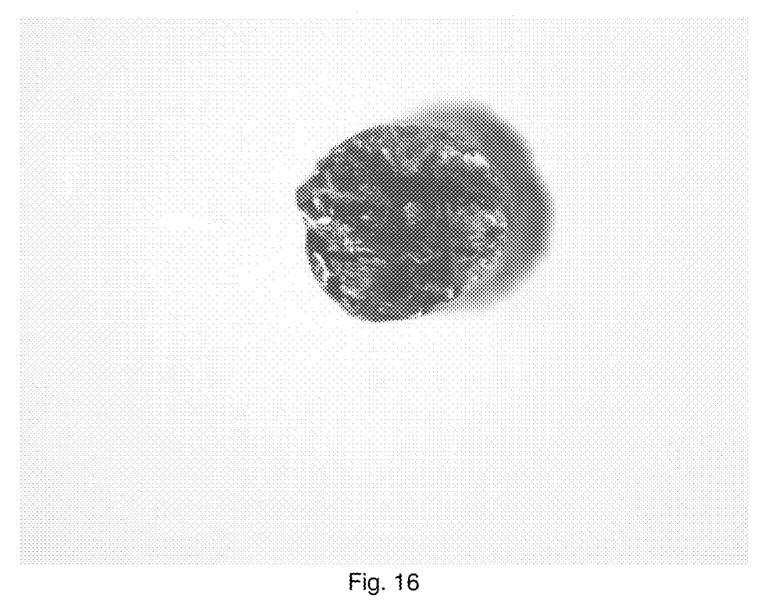
FIG. 16 is an optical photograph of the bulk amorphous carbon sample synthesized at 27 GPa and 700° C. in Example 4.

The optical photograph of the amorphous carbon sample synthesized at 900° C. is shown in FIG. 15. The sample was also transparent with a yellow colour. The cleaned sample was characterized for structure and properties. Similar to the above samples, the XRD spectrum of the sample (FIG. 2) shows two broad peaks at 42° and 84°, indicating that the sample had an amorphous structure. The $sp^3$ content of the sample was 94.7±2.2%, estimated by the electron energy loss spectrum analysis (FIG. 4), which was very close to the amorphous carbon sample synthesized at 1000° C. The thermal conductivity and optical absorption of sample were tested. The thermal conductivity of the sample was determined as 23 W/mK measured by the TDTR method (FIG. 9). The optical band gap of the sample was calculated to be 2.79 eV by the UV-visible absorption test (FIG. 10). As for the amorphous carbon sample synthesized at 700° C., it had a yellow-brown colour (as shown in FIG. 16), and a $sp^3$ content calculated as 83.3% by its electron energy loss spectrum (as shown in FIG. 4). This shows that the synthesis of high-quality $sp^3$ amorphous carbon samples requires strict pressure and temperature conditions. In this invention, the most suitable temperature and pressure were 27 GPa and 900-1000° C., respectively.

Example 5

5 mg of dried high-purity $C_{60}$ powder was put into a 6/1.5 high-pressure assembly, which was then put into a high-pressure apparatus, pressurized to a pressure of 37 GPa in 10 hours, and heated to a temperature of 1000° C. with a rhenium tube before heat preservation for 1 hour, and then immediately quenched to room temperature, and depressurized to ambient pressure in 20 hours. The high-pressure assembly was then taken out and opened to obtain the sample with a size of about 1 mm. The sample was then ultrasonically cleaned with acetone.

Figure 17:
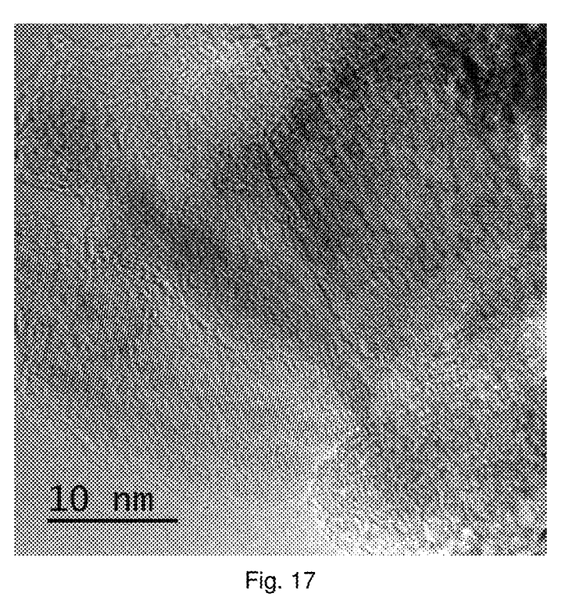
FIG. 17 is an HRTEM image of the sample synthesized in Example 5.

By structural characterization of the sample synthesized under this condition, a diamond structure was observed in the sample, that is, the sample was a mixture of diamond and $sp^3$ amorphous carbon. The presence of the diffraction peaks of the (111), (220) and (311) planes of diamond in the XRD spectrum of the sample (FIG. 2) indicate the formation of diamond. At the same time, it was also observed using the transmission electron microscope that the sample contained a small amount of diamond nanocrystals with grain sizes from 10 to 20 nm (FIG. 17). An electron energy loss spectrum test was performed on this area, in which the typical spectral characteristics of nanocrystalline diamond were showed (FIG. 4). The above results indicate that the synthesis of high-quality $sp^3$ amorphous carbon requires the control of the temperature and pressure conditions. Although the increase in pressure may effectively promote the increase of the $sp^3$ carbon component in the amorphous carbon, $C_{60}$ would be easily converted to diamond at an over-high pressure.

From the comparative analysis of the above experimental results, we can conclude that bulk transparent superhard amorphous carbon with a high $sp^3$ content, even $sp^3$ content close to 100%, can be synthesized using fullerene $C_{60}$ as the precursor in a large-volume press, at a pressure close to the $C_{60}$ cage collapse boundary (27 GPa). In the disordered network of this amorphous carbon material, a large number of randomly distributed diamond-like medium-range ordered clusters having a size smaller than 1 nm were contained. The synthesized amorphous carbon samples had excellent mechanical and thermal properties, and had a Vickers hardness of up to 102 GPa and a thermal conductivity of up to 26 W/mK. At the same time, it was found that pressure played a critical role in the synthesis of high-quality $sp^3$ carbon. With the increase of the pressure, the $sp^3$ content of the amorphous carbon sample increased from 84.8% (synthesized at 20 GPa) to 95.1% (synthesized at 27 GPa), which is close to the $sp^3$ content of diamond. The $sp^3$ content in the amorphous carbon sample would significantly affect the physical properties of the sample. With the increase of the $sp^3$ content, the mechanical and thermal properties of the amorphous carbon are improved, and the optical band gap can be tuning in a wide range of 1.90-2.79 eV.

The invention provides a series of millimeter-sized bulk amorphous carbon materials with high $sp^3$ contents (greater than 80%), which are synthesized using advanced large-volume HTHP experimental technology. It should be noted that in the field of HTHP technology, there will be differences in the ranges of the pressure and temperature calibrations when using different presses and assembly methods. The ranges of the temperature and pressure for the synthesis of the amorphous carbon materials in the examples of the invention are for reference only, and cannot be regarded as limitations to the invention. Any bulk high-quality transparent amorphous carbon with an $sp^3$ content close to 100% and synthesized using fullerene $C_{60}$ as the precursor under HTHP conditions should be considered as within the scope of the invention.

The invention claimed is:

1. A method for preparing a millimeter-sized bulk $sp^3$ amorphous carbon material, comprising a step of performing a high-temperature and high-pressure (HTHP) treatment on a sample of $C_{60}$ powder in a Walker-type large-volume press at a temperature of 900-1000° C., and a pressure of 27 GPa, so as to obtain the millimeter-sized bulk $sp^3$ amorphous carbon material.

2. The method of claim 1, wherein the $C_{60}$ powder is encapsulated into a sample chamber made of metal Re to undergo the HTHP treatment.

3. The method of claim 1, further comprising a step of heat-treating the $C_{60}$ powder, at a temperature from 80° C. to 150° C. for 2 to 4 hours, to obtain dried $C_{60}$ powder before the HTHP treatment.

4. The method of claim 1, wherein the HTHP treatment comprises pressurizing the $C_{60}$ powder to said pressure within 7-10 hours, and heating the $C_{60}$ powder to said temperature using a rhenium tube.

5. The method of claim 1, further comprising a step of heat and pressure preservation of the treated sample for 1-2 hours after the HTHP treatment.

6. The method of claim 1, wherein the treated sample is cooled to room temperature by quenching immediately after the HTHP treatment and is depressurized to ambient pressure within 14-20 hours.

7. The method of claim 1, further comprising ultrasonically cleaning the treated sample in acetone and polishing the treated sample with a diamond grinding disc to obtain a pure bulk amorphous carbon material.

8. The method of claim 1, wherein a mass purity of the $C_{60}$ powder is greater than or equal to 99.9%.

9. The method of claim 1, wherein an $sp^3$ content of the bulk $sp^3$ amorphous carbon material is in a range of 83.3% to 95.1%.

10. The method of claim 1, wherein an optical band gap of the bulk $sp^3$ amorphous carbon material is in a range of 1.90-2.79 eV.

11. The method of claim 1, wherein a thermal conductivity of the bulk $sp^3$ amorphous carbon material is in a range of 18-26 W/mK.

12. The method of claim 1, wherein a Vickers hardness of the bulk $sp^3$ amorphous carbon material is in a range of 95-102 GPa.

13. The method of claim 1, comprising:
step 1: heating a sample of $C_{60}$ powder at a temperature in a range of 80-150° C. for 2-4 hours to obtain dried $C_{60}$ powder;
step 2: encapsulating the $C_{60}$ powder heated in step 1 into a sample chamber made of metal Re, which is then placed in an HTHP apparatus of a Walker-type large-volume press to undergo a HTHP treatment at a temperature of 900-1000° C. and a pressure of 27 GPa, followed by heat and pressure preservation for 1-2 hours, subsequent immediate quenching to room temperature and slowly depressurizing to ambient pressure, and taking out the sample; and
step 3: ultrasonically cleaning the sample in acetone, and then polishing it with a diamond grinding disc to obtain a pure bulk $sp^3$ amorphous carbon material.

* * * * *